July 7, 1936.  E. W. VARS  2,046,981
FLUX COATED ELECTRODE AND METHOD OF MAKING THE SAME
Filed Oct. 5, 1933
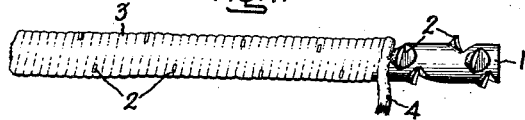
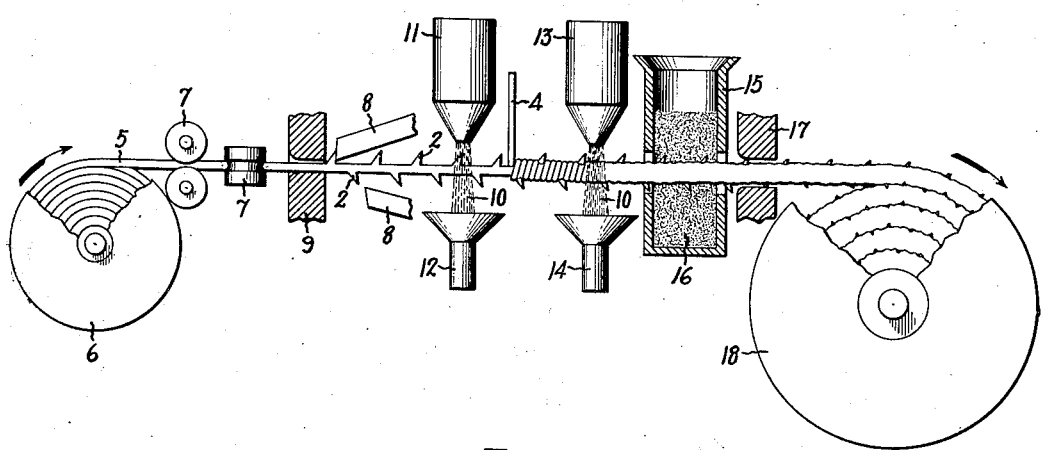
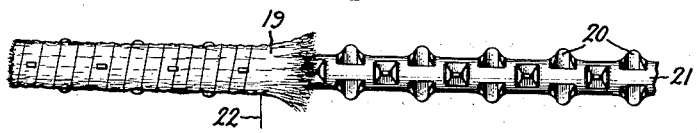
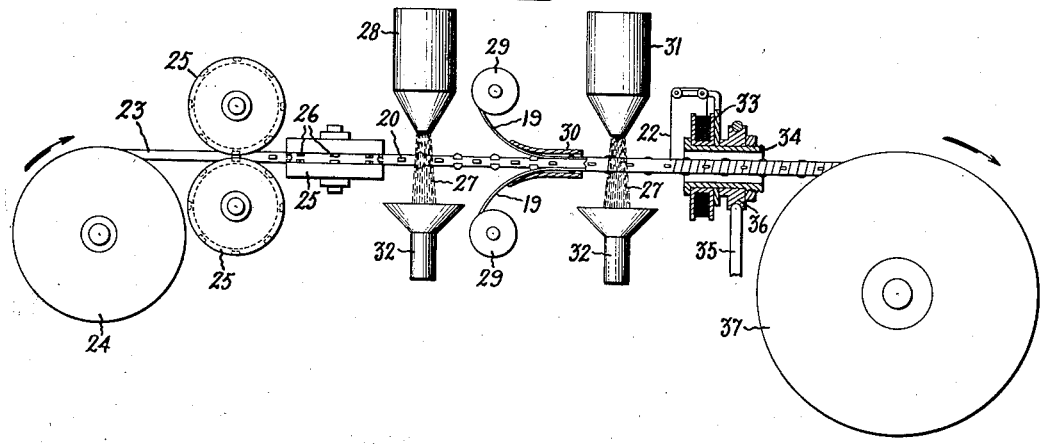
Inventor:
Ethan W. Vars,
by Harry E. Dunham
His Attorney.

Patented July 7, 1936

2,046,981

UNITED STATES PATENT OFFICE 2,046,981

FLUX COATED ELECTRODE AND METHOD OF MAKING THE SAME

Ethan W. Vars, Erie, Pa., assignor to General Electric Company, a corporation of New York Application October 5, 1933, Serial No. 692,348

6 Claims. (Cl. 219—8)

My invention relates to arc welding electrodes.

Welding electrodes are often provided with surface coatings called fluxes which are used to improve the arcing characteristic of the electrode as well as to improve the quality of the weld metal produced thereby.

Most electrode fluxes are of an electrically non-conducting character, and if the coating on the electrode is of substantial thickness it is necessary to remove a portion thereof to adapt the electrode for use. In hand-welding an end of the electrode is bared so that welding current can be supplied thereto by means of an electrode holder and in automatic arc welding special means are provided for supplying welding current through the coating, or a portion of the coating on the electrode is removed for this purpose.

It is an object of my invention to provide an electrode of improved construction to which welding current may be supplied without removing a portion of its coating or without providing special means for supplying welding current through incisions or openings produced in its coating.

More particularly it is an object of my invention to provide an electrode coated with strands of flux impregnated fibrous material arranged between fin-like projections forming an integral part of the electrode and serving to hold the fibrous material in place on the electrode as well as to conduct welding current into the electrode.

It is a further object of my invention to provide convenient and economical methods of fabricating electrodes in accordance with my invention.

Further objects of my invention will become apparent from the following description taken in connection with the accompanying drawing, Figs. 1 and 3 of which illustrate electrodes embodying my invention, and Figs. 2 and 4 of which diagrammatically represent one method and apparatus for making each of said electrodes.

According to my invention a small amount of the surface metal of the electrode is raised to form projections which extend through the flux coating applied thereto. Thus, for example, in Fig. 1 a portion of the surface metal of an electrode 1 is struck up to form fin-like projections 2 which extend through the flux coating 3 applied to the surface of the electrode. In the construction illustrated, this coating 2 comprises a helical wrapping of strands of flux impregnated fibrous material 4 which is arranged between the projections 2. It will be noted that the projections extend parallel to the wrapping and are separated from one another circumferentially as well as lengthwise of the electrode. These projections serve as conductors for the welding current and also serve to reinforce the flux coating against compressive forces. When using electrodes in accordance with my invention for hand welding, it is not necessary to use short lengths as in the past, since the welding current may be supplied to the electrode at any point along its length. Neither is it necessary in automatic welding to use means for removing a portion of the surface coating of the electrode or for making incisions or openings in the flux coating for supplying welding current to the electrode.

In Fig. 2, I have diagrammatically illustrated apparatus for manufacturing an electrode such as illustrated in Fig. 1. This machine operates as follows: Electrode material 5 is withdrawn from a reel 6 by propelling and straightening rolls 7 which may also serve to time the cutting strokes of the projection raising tools 8. 9 represents a guide which centers the wire relative to the tools 8 and also serves to absorb the cutting force from these tools. The tools 8 are preferably grouped about the wire and arranged to strike the wire according to predetermined timing which automatically locates contacts 2 in a predetermined helical pattern about and along the wire. The contacts 2 are raised far enough above the surface of the wire so that they will project beyond the flux coating applied thereto. An initial flux coating is applied to the wire by discharging liquid flux 10 on to the wire. This flux is supplied through a nozzle 11 and the surplus material is collected by a receiver 12 from which it is withdrawn and again supplied to the nozzle 11. A wrapping 4 of fibrous material is then applied to the wire and another coating of liquid flux applied to the wrapped wire by means of another nozzle 13. The surplus material supplied by this nozzle is collected by another receiver 14. The flux coated wire is then passed through a container 15 in which there is a suitable drying material 16 which acts to set the flux. The openings in the container 15 through which the covered wire passes may also be used for sizing the flux coating. Means 17 may also be provided for sizing the contacts 2 to form an electrode of predetermined diameter which is then coiled on a reel 18.

The stranded flux impregnated fibrous material may also be applied to the electrode along its length, as illustrated in Fig. 3. In such case the flux material 19 is placed between parallel rows of longitudinally disposed fin-like projections 20 forming an integral part of the electrode 21. The flux material 3 may be held in place on the electrode by the adhesive character of the flux even when wet, but I prefer also to provide a binding string or strings 22 for holding it in place thereon. Most fluxes when dry will adhere to the electrode and the use of a binding string or strings will hold the fibrous flux impregnated material in place on the electrode until the flux dries.

Apparatus for manufacturing the electrode of Fig. 3 is diagrammatically illustrated in Fig. 4. In the apparatus there illustrated electrode wire 23 is withdrawn from a reel 24 by feed rolls 25. These feed rolls are grooved so that oppositely disposed pairs completely encircle the electrode. The groove of each wheel is provided with oppositely disposed projections 26 which squeeze up from the surface material of the electrode a rounded fin-like projection such as 20 illustrated in Figs. 3 and 4. The electrode wire is then coated with a flux material 27 supplied through a nozzle 28. A coating of fibrous material 19 is then applied to the electrode from reels 29 through the agency of a nozzle 30, which uniformly distributes this fibrous material about the surface of the electrode wire. Another coating of flux material 27 is then applied to the coated wire through another nozzle 31. The surplus of the flux material supplied through nozzles 28 and 31 is collected by receivers 32 from which it is again supplied to the nozzles 28 and 31. The flux impregnated surface coating is then wrapped with a binding cord or cords 22 which is supplied from a reel 33 located on a flier 34 which is rotated about the axis of the coated wire by means of a belt 35 and pulley 36. Since the speed of fabricating the electrode may be limited by the speed at which a single binding or wrapping cord 22 can be applied thereto, this difficulty may be eliminated by using a number of wrapping cords in parallel. After the electrode has been thus wrapped it may in some cases be necessary to dry the flux material on the electrode or to use a flux setting powder such as employed in the machine of Fig. 2. It is also to be understood that the electrode may be sized by passing it through a suitable opening as in the machine of Fig. 2. The finished electrode is then coiled upon a reel 37.

The practical advantage of the method last described for raising fin-like projections on the electrodes lies in the high speed at which the operation can be carried out as compared to the operation of producing barbs or pronglike projections on the surface of the electrode such as described above in connection with Figs. 1 and 2. Furthermore, the shape of the projection produced by squeezing up a portion of the surface metal of the electrode is better adapted as a contact and as a reinforcement for the flux coating than is the barbed or pronglike projections of the electrode illustrated in Fig. 1. The electrode is also safer to handle due to the absence of sharp points characteristic of the electrode illustrated in Fig. 1.

It is to be noted that the projections on the electrode when formed in accordance with my invention constitute but a small amount of the total metal in the electrode. It is therefore possible to maintain the desired relation between the cross-sectional area of the electrode and the cross-sectional area of the flux without in any way impairing the arcing characteristics of the electrode. In the examples illustrated and described above, round wire has been employed as the electrode material. This is because round wire is the most economical shape which can be produced and a modified round wire is consequently of the greatest practical value as a base for the projections. It is to be understood, however, that wires of other shapes may be employed without departing from my invention.

The fin-like projections on the electrode may be raised to any reasonable height in relation to the coating applied to the electrode. It is desirable that the projections extend through the flux for by employing this construction they will be self-clearing due to the friction exerted thereon when passing through the current supplying means forming part of the welding machine. If the height of the projection is just equal to the thickness of the flux coating, it is liable to gather flux on its contacting tip, and this will be a potential source of arcing which may damage the means provided in the welding machine for supplying welding current to the electrode. These projections may be raised at the same time that the coating is applied to the electrode, or they may be raised at the time the wire is rolled or formed in the mill. It is desirable to form these projections at the same time that the flux is applied so that their height may be regulated in accordance with the thickness of the flux applied to the electrode.

Heavy coated electrodes may be made in accordance with my invention at a greatly reduced cost as compared with most other methods of fabricating heavy coated electrodes. With regard to the matter of economy it is also to be noted that no part of the flux coating on the electrode is wasted when using the electrode, and that when hand-welding, it is not necessary to operate with electrodes of extremely short lengths which results in a considerable loss due to the discarded end-portions which cannot be used for welding.

In describing my invention I have referred to electrodes having a surface coating of flux impregnated fibrous material. It is to be understood, of course, that the invention is not limited to electrodes of this construction, since other flux coatings may also be employed without departing from my invention.

What I claim as new and desire to secure by Letters Patent of the United States, is:

1. An arc welding electrode having a coating of strands of flux impregnated fibrous material through which extend fin-like projections forming an integral part of said electrode.

2. An arc welding electrode coated with a helical wrapping of flux impregnated fibrous material arranged between fin-like projections extending parallel to said wrapping and separated from one another circumferentially as well as lengthwise of said electrode.

3. An arc welding electrode coated with strands of flux impregnated fibrous material arranged between parallel rows of fin-like projections forming part of said electrode and extending through said coating.

4. An arc welding electrode coated with strands of flux impregnated fibrous material arranged between parallel rows of staggered fin-like projections extending along said electrode and forming a part thereof.

5. The method of making a fluxed welding electrode which comprises raising small amounts of the surface metal of the electrode to form fin-like projections, applying strands of fibrous material to said electrode between said projections, and impregnating said strands with flux to form a coating through which said projections extend.

6. The method of making a fluxed welding electrode which comprises cutting and raising helically disposed fin-like projections from the surface metal of the electrode, applying a helical wrapping of fibrous material to said electrode between said projections, flux impregnating said wrapping, and sizing said projections to form an electrode of predetermined diameter in which said projections extend through the coating formed by said flux impregnated wrapping.

ETHAN W. VARS.